United States Patent [19]  [11]  4,321,171
Henderson et al.  [45]  Mar. 23, 1982

[54] POLYMERIZATION PROCESS SHORT STOPPED WITH UNDISPROPORTIONATED ROSIN ACID

[75] Inventors: James N. Henderson, Hudson; Paul H. Sandstrom, Tallmadge, both of Ohio

[73] Assignee: The Goodyear Tire & Rubber Company, Akron, Ohio

[21] Appl. No.: 188,422

[22] Filed: Sep. 18, 1980

[51] Int. Cl.$^3$ .......................... C08L 93/04; C08J 3/00
[52] U.S. Cl. ..................................... 526/84; 524/274
[58] Field of Search ....................... 260/27 BB, 27 R; 526/84

[56] References Cited

U.S. PATENT DOCUMENTS

| | | | |
|---|---|---|---|
| 2,608,541 | 8/1952 | Troyan et al. | 260/27 BB |
| 2,649,425 | 8/1953 | Hulse | 260/27 BB |
| 2,784,165 | 3/1957 | Howland | 260/27 BB |
| 2,993,874 | 7/1961 | Hoel | 260/27 BB |

Primary Examiner—H. S. Cockeram
Attorney, Agent, or Firm—H. C. Young, Jr.

[57] ABSTRACT

Method and composite of forming an elastomer product which comprises (A) solvent solution polymerizing an olefin monomer in the presence of an organometallic catalyst, (B) shortstopping the reaction with an excess of a rosin acid which has not been submitted to a disproportionation process and (C) recovering the elastomer composite.

3 Claims, No Drawings

POLYMERIZATION PROCESS SHORT STOPPED WITH UNDISPROPORTIONATED ROSIN ACID

FIELD OF INVENTION

This invention relates to rubber compositions and to a method of preparation. The invention further relates to pneumatic rubber tires containing such composition.

BACKGROUND OF THE INVENTION

For aqueous emulsion polymerization of monomers to form rubbery polymers, disproportionated rosin acids in the form of alkali salts thereof are typically utilized in the emulsification system. The disproportionated rosin acid salt generally serve a dual purpose, first as an emulsion aid during the polymerization and, secondly, in the polymer after its recovery from the polymerization system as a compounding additive in the preparation of a compounded rubber.

The disproportionated rosin acid salt itself is typically converted to the rosin acid form as a result of the acidic condition of the coagulation or isolation step for recovering the rubber from the emulsion or latex.

Thus, the rosin is usually present in the emulsion as the salt and present in the recovered rubber as the acid.

It is considered necessary, in the aqueous emulsion polymerization process, that the rosin acid or salt thereof be used in a disproportionated form so that its conjugated double bonds are essentially eliminated and thus substantially prevented from interfering with the emulsion polymerization system. The disproportionation of the rosin acid can be typically accomplished by heating the acid in the presence of a catalyst to modify its double bonds, namely, to eliminate their conjugated configuration.

For solution polymerization of monomers to form rubbery polymers where an emulsion is not desired, disproportionated rosin acids have been used directly as a shortstop rather than adding the alkali salt thereof. In such application, the rosin acid is added to the polymerization system at a desired time to stop the polymerization reaction as compared to the utilization of the salt form of the acid during an emulsion polymerization as an emulsifying aid.

However, it should be appreciated that the use of such disproportionated rosin acid for these purposes in a solution polymerization can add an appreciable cost to the recovered rubber itself.

Therefore, it is desired to provide an effective shortstop means for a solution polymerization system in order to prepare a rubber composition, as well as a resultant tire containing such a rubber composition.

DISCLOSURE AND PRACTICE OF THE INVENTION

In accordance with an aspect of this invention, a method of forming an elastomer product is provided which comprises (A) solvent solution polymerizing at least one olefin monomer in the presence of an organo-metallic catalyst to form an elastomeric polymer or copolymer, (B) shortstopping the reaction with about a 10 to about a 50 mole percent stoichiometric excess of a rosin acid which has not been submitted to a disproportionation process and therefore a majority of its carbon-to-carbon double bonds are conjugated, and (C) recovering the elastomer product containing the rosin acid from the polymerizate.

Thus, the rosin acid is essentially undisproportionated as compared to the more conventional use of disproportionated rosin acids for this purpose.

The stoichiometric excess of the rosin acid relates to an excess over the amount necessary to stop the polymerization process.

This discovery is considered a departure from a past practice of both only using about a stoichiometric amount and of using disproportionated rosin acid instead of undisproportionated rosin acid.

In the practice of this invention, it has been surprisingly found that the excess of the undisproportionated rosin acid can also act in the nature of an antiozonant for the rubber itself when present in combination with a small amount of antiozonant, thereby allowing the rubber to optionally require less of a conventional antiozonant additive. This additional discovery has particularly been observed where the additional antiozonant was of the amine type.

The utilization of an excess of such undisproportionated rosin acid is particularly valuable as an antiozonant aid since by incorporating it in the rubber as a shortstop in the solution polymerization, the actual mixing of the acid into the rubber is accomplished with greater efficiency and effectiveness. Thus, the shortstop acid also acts as a valuable compounding ingredient by providing for a more efficient use of conventional antiozonant additive.

Therefore, in further accordance with this invention, a rubber composition is provided which is prepared by the method of this invention. Such rubber composition is a composite of the elastomer product and rosin acid.

In the practice of this invention, the solvent solution polymerization can conveniently be conducted by polymerizing olefin monomers in the presence of a volatile organic solvent with the aid of an ionic or coordinate-ionic catalyst. After the polymerization has proceeded to a desired extent, as evidenced by the degree or percent of monomer conversion, by amount of polymer formation by solution viscosity or by temperature profile of the reaction system, the stoichiometric excess of the undisproportionated rosin is added as a shortstop to stop the polymerization.

The resultant polymer can then be recovered from the polymerizate by conventional means such as by coagulation, steam stripping, or direct desolventization methods such as flash evaporation, vacuum drum drying, extruder drying and the like. It perhaps should be mentioned that, typically, though not invariably, solution polymerization systems are generally restricted or limited to hydrocarbon monomers and solvents. This is because the presence of atoms such as oxygen, sulfur, nitrogen, and halogen can often lead to undesirable side-reactions by the ionic catalysts.

Various olefins can be polymerized in the practice of this invention to form useful polymers. Although it is generally desired to prepare rubber elastomers or polymers, this invention is not necessarily to be so limited.

Representative of various monoolefins are styrene, α-methylstyrene, ethylene, propylene, butene, particularly 1-butene, hexene, methacrylate, and methyl and ethyl methacrylates.

Representative of various diolefins are 1,3-butadiene, isoprene, piperylene and 2,3-dimethylbutadiene.

Typically rubbery polymers prepared from such monomers are cis 1,4-polybutadiene, cis 1,4-polyisoprene, butadiene/styrene copolymers and butadiene/acrylonitrile coplymers.

Various volatile organic solvents can be used for the solution polymerization system representative of which are liquid aliphatic hydrocarbons containing 4 to 7 carbon atoms such as butane, pentane, hexane, heptane and cyclohexane; and aromatic liquid hydrocarbons such as benzene and toluene.

The term "volatile organic solvent" means liquid organic solvent with significant vapor pressure at ordinary temperatures, for example with vapor pressure of 0.01 atmosphere or more at about 25° C.

Various catalysts and catalyst systems can be used in the practice of this invention, representative of which are trialkyl aluminum-nickel carboxylate-boron trifluoride etherate; trialkyl aluminum-organonickel compound-hydrogen fluoride; alkyl aluminum halide-cobalt carboxylate; alkyl aluminum-titanium salt; alkyl aluminum-titanium salt-iodine complex; alkyl lithium; alkyl lithium-amine complex.

The practice of this invention is further illustrated by reference to the following examples which are intended to be representative rather than restrictive of the scope of the invention. Unless otherwise indicated, all parts and percentages are by weight.

EXAMPLE I

In a continuous polymerization reactor chain, polybutadiene with over 95 percent cis 1,4-content was prepared in hexane solvent using as a catalyst a mixture of triethyl aluminum, boron trifluoride di-n-butyl octoate and nickel octoate as generally described in U.S. Pat. No. 4,020,255. The weight proportions of the catalyst were 9.63 Al; 7.95 B; and 1.0 Ni; with 0.0059 parts nickel octoate being used per hundred parts 1,3-butadiene monomer. The 1,3-butadiene monomer charge was 19 weight percent with the remainder being the hexane solvent and catalyst.

The polymerization was shortstopped with 1.04 parts disproportionated rosin acid per 100 parts butadiene rubber (phr) and protected with the addition of 1.06 phr di-t-butyl-p-cresol antioxidant.

The rubber was recovered from the hexane solvent by precipitation and dried.

The resulting composite of polybutadiene containing the disproportionated rosin acid and antioxidant had a Mooney (M/L-4) of 58.

EXAMPLE II

Polybutadiene was prepared as in Example I under the same operating conditions except that the polymer was not shortstopped with disproportionated rosin acid. Instead, it was shortstopped with 1.1 phr methanol.

EXAMPLE III

Polybutadiene was prepared as in Example I except that the polymer was shortstopped with 0.7 phr disproportionated rosin acid.

EXAMPLE IV

Polybutadiene was made in a continuous stirred tank reactor at 74° C. by feeding a purified solution of 1,3-butadiene in hexane (14% by weight) and 1.2 phr butyllithium (1.6 moles/1 hexane solution). Conversion was 85 percent at a cycle time of 1.1 hours. The shortstop was methanol in hexane solution, at 5 phr. The polymers was protected against oxidation by addition of 0.5 phr of a phenolic antioxidant.

EXAMPLE V

A. Test Sample Preparation

Samples of several rubber blend compositions were prepared for evaluation of ozone resistance. Such rubber blend compositions were prepared by mixing the rubbers in a Banbury with carbon black and other ingredients as specified in Table 1. Sulfur and accelerators were then milled into the black stocks. The resulting compositions were sheeted out and press cured in a tensile sheet cavity for 18 and 36 minutes at 300° F. Samples for static ozone testing were cut from the tensile sheets and exposed to 50 pphm ozone at 100° F. for up to 120 hours at a 25 percent strain. The test samples were compared after ozone exposure by the following rating system.

TABLE 1

| (OZONE RATING) | |
|---|---|
| 0 = No cracking | F = Complete failure |
| Number of Cracks | Size of Cracks |
| A = Very few (less than ¼ surface) | 1 = Small (hairline) |
| B = Few (¼ to ½ surface) | 2 = Medium |
| C = Moderate (½ to ¾ surface) | 3 = Large |
| D = Heavy (¾ to all surface) | 4 = Severe (open) |

B. Ozone Test Results

Series A

Vulcanizate samples of the polybutadienes from Example I (PBD-I) and Example II (PBD-II) were exposed to ozone for 144 hours. The results are shown in Series A of Table 2. The polybutadiene shortstopped with rosin acid exhibits better static ozone resistance than the polybutadiene shortstopped with methanol.

Series B

Vulcanizate samples containing the polybutadiene of Example III (PBD-III) were exposed to ozone for 144 hours. The effect of mill addition of 1 and 2 parts of rosin acid in addition to the shortstop was evaluated. The results in Series B of Table 2 demonstrate the improved ozone resistance obtained from the addition of rosin acid.

Series C

Vulcanizate samples containing the methanol shortstopped polybutadiene of Example IV (PBD-IV) were exposed to ozone for 144 hours. The effect of mill addition of 1 and 2 parts of a disproportionated tall oil rosin acid or a non-disproportionated tall oil rosin acid was evaluated. Both rosin acids provide improved ozone resistance to the methanol shortstopped polybutadiene vulcanizate samples.

TABLE 2

| COMPOUND RECIPE | |
|---|---|
| Banbury Mix | Parts |
| Natural Rubber (Brown Crepe No. 2) | 40 |
| Polybutadiene | 60 |
| Process Oil | 10 |
| Tackifying Resin | 5 |
| Stearic Acid | 1 |
| Antioxidant (amine) | 3 |
| Antiozonant (amine) | 1 |
| FEF Carbon Black | 50 |

TABLE 2-continued

| COMPOUND RECIPE | |
|---|---|
| Wax | 1 |
| Zinc Oxide | 3.5 |
| Mill Mix | Parts |
| Sulfur | 2.25 |
| Accelerators | .55 |

TABLE 3

STATIC OZONE RESISTANCE

| | | | | OZONE RATING 18 min/36 min @ 300° F. | | |
|---|---|---|---|---|---|---|
| Series | PBD | Shortstop, PHR | Additive, PHR | 24 hrs. | 72 hrs. | 144 hrs. |
| A | PBD-I | rosin,acid[1], 1.0 | none | 0/A2 | 0/C4 | 0/D4 |
| A | PBD-II | methanol, 1.1 | none | A2/C2 | B4/D4 | D4/D4 |
| B | PBD-III | rosin acid[1], 0.7 | none | A2/D2 | A3/D2 | A4/D4 |
| B | PBD-III | rosin acid[1], 0.7 | rosin acid[1], 1.0 | 0/A1 | 0/A2 | 0/A2 |
| B | PBD-III | rosin acid[1], 0.7 | rosin acid[1], 2.0 | 0/0 | 0/0 | 0/0 |
| C | PBD-IV | methanol, 0.5 | none | A3/A3 | A4/C4 | F/D4 |
| C | PBD-IV | methanol, 0.5 | rosin acid[2], 1.0 | 0/A1 | 0/B4 | 0/F |
| C | PBD-IV | methanol, 0.5 | rosin acid[2], 2.0 | 0/0 | 0/0 | 0/0 |
| C | PBD-IV | methanol, 0.5 | rosin acid[3], 1.0 | 0/0 | 0/A4 | 0/A4 |
| C | PBD-IV | methanol, 0.5 | rosin acid[3], 2.0 | 0/0 | 0/0 | 0/0 |

[1]Disproportionated wood rosin acid (Resin 731-D-TM-Hercules).
[2]Disproportionated tall oil rosin acid (Westvaco Resin 90-TM-Westvaco).
[3]Non-disproportionated tall oil rosin acid (Westvaco Rosin S-TM-Westvaco).

EXAMPLE VI

Polybutadiene was prepared as in Example I under similar operating conditions except that the polymer was shortstopped with non-disproportionated rosin acid.

Non-disproportionated rosin acid and disproportionated rosin acid are not readily distinguishable in their effects in ionic solution polymerization, whether as shortstopping agents, or as agents for improving the ozone resistance of the rubbers.

However, non-disproportionated rosin acids interfere in emulsion polymerization, whereas disproportionated acids do not have this disadvantage. In ionic solution polymerizations, to which this invention is directed, the non-disproportionated rosin acids have had no disadvantage and they do provide a significant cost savings compared to disproportionated rosin acids.

In the practice of this invention, it is required that the rosin acid is characterized by not having been submitted to a disproportionation process and therefore, a majority of its carbon-to-carbon double bonds are conjugated. In other words, an undisproportionated rosin acid is requied.

Such undisproportionated rosin acids typically have about 50 to about 100, and more particularly have about 80 to about 95 percent of its carbon-to-carbon double bonds in a conjugated arrangement. Conversely, such rosin acids, which have been submitted to a disproportionation process conventionally have less than about 5 percent of their aliphatic carbon-to-carbon double bonds in a conjugated configuration. The term aliphatic, as used herein, also relates to cycloaliphatic.

Further, aromatic unsaturation as found in benzene rings is not considered conjugated for the purpose of this discussion.

While certain representative embodiments and details have been shown for the purpose of illustrating the invention, it will be apparent to those skilled in this art that various changes and modifications may be made therein without departing from the spirit or scope of the invention.

What is claimed is:

1. A method of forming an elastomer product which comprises (A) organic solvent solution polymerizing at least one olefin monomer in the presence of an organometallic catalyst to form an elastomeric polymer or copolymer, (B) shortstopping the reaction with about a 10 to about a 50 mole percent stoichiometric excess of a rosin acid which has not been submitted to a disproportionation process and therefore a majority of its carbon-to-carbon double bonds are conjugated, and (C) recovering the elastomer product containing the rosin acid from the polymerizate.

2. The method according to claim 1 where said elastomeric polymer product is selected from at least one of cis 1,4-polybutadiene, cis 1,4-polyisoprene, butadiene/styrene copolymers and butadiene/acrylonitrile copolymers; the solvent for said polymerization is selected from at least one of butane, pentane, hexane, heptane, cyclohexane benzene and toluene; and where said catalyst is selected from at least one of trialkyl aluminum-nickel carboxylateboron trifluoride etherate; trialkyl aluminum-organonickel compound-hydrogen fluoride; alkyl aluminum halide-cobalt carboxylate; alkyl aluminum-titanium salt; alkyl aluminum-titanium salt-iodine complex; alkyl lithium; and alkyl lithium-amine complex.

3. The method according to claim 2 where said undisproportionated rosin acid has about 80 to about 95 percent of its carbon-to-carbon double bonds in a conjugated configuration.

* * * * *